United States Patent
Marsh et al.

(10) Patent No.: US 12,286,524 B2
(45) Date of Patent: *Apr. 29, 2025

(54) FLEXIBLE SEAWEED-BASED THIN FILMS AND ASSOCIATED SOLUTION CASTING SYSTEMS AND METHODS

(71) Applicant: Sway Innovation Co., Alturas, CA (US)

(72) Inventors: Julia Marsh, Berkeley, CA (US); Joakim Lars Georg Engström, Berkeley, CA (US); Matthew Catarino, Berkeley, CA (US); Matthew Mayes, Alturas, CA (US)

(73) Assignee: SWAY INNOVATION CO., Alturas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,412

(22) Filed: Feb. 6, 2024

(65) Prior Publication Data

US 2024/0262980 A1    Aug. 8, 2024

Related U.S. Application Data

(60) Provisional application No. 63/483,359, filed on Feb. 6, 2023.

(51) Int. Cl.
   *C09D 101/00*    (2006.01)
   *C08K 5/053*    (2006.01)
   (Continued)

(52) U.S. Cl.
   CPC ............... *C08K 5/053* (2013.01); *C08L 5/12* (2013.01); *C09D 101/02* (2013.01); *C09D 105/12* (2013.01); *C08L 2203/162* (2013.01)

(58) Field of Classification Search
   CPC ..... C08K 5/053; C08L 5/12; C08L 2203/162; C09D 101/02
   (Continued)

(56) References Cited

U.S. PATENT DOCUMENTS

| 5,654,103 A | 8/1997 | Troadec |
| 7,067,568 B1 | 6/2006 | Ghosh et al. |

(Continued)

FOREIGN PATENT DOCUMENTS

| CN | 107083045 B | 8/2017 |
| CN | 117715537 A | 3/2024 |

(Continued)

OTHER PUBLICATIONS

Chitra, et al., "Investigation of seaweed derivative iota-carrageenan based biopolymer electrolytes with lithium trifluoromethanesulfonate," Mater. Res. Express 2020, 7, 015309.

(Continued)

*Primary Examiner* — James E McDonough
(74) *Attorney, Agent, or Firm* — Perkins Coie LLP

(57) ABSTRACT

Compostable seaweed-based thin films, and associated systems and methods are disclosed herein. In some embodiments, an exemplary seaweed-based thin film comprises a seaweed-based composition comprising agar, alginate, carrageenan, semi-refined seaweed, and/or unprocessed seaweed; an agent comprising glycerin, sorbitol, sodium lignosulphonate, potassium lignosulphonate, calcium lignosulphonate, ammonium lignosulphonate, lignosulphonate, citric acid, ascorbic acid, ethylene glycol, polyethylene glycol, polyglyceride fatty acid esters, guar gum, tributyl citrate, and/or propylene glycol; and water. The seaweed-based composition can comprise 50-90 wt % of the seaweed-based thin film, the agent can comprise no more than (Continued)

40 wt % of the seaweed-based thin film, and the water can comprise 0.1-50 wt % of the seaweed-based thin film.

29 Claims, 2 Drawing Sheets

(51) Int. Cl.
  *C08L 5/12* (2006.01)
  *C09D 101/02* (2006.01)
  *C09D 105/12* (2006.01)
(58) Field of Classification Search
  USPC .................................................. 106/163.01
  See application file for complete search history.

(56) References Cited

U.S. PATENT DOCUMENTS

| | | | |
|---|---|---|---|
| 11,479,375 | B2 | 10/2022 | Paslier et al. |
| 11,939,724 | B2 * | 3/2024 | Catarino .................. C08L 3/04 |
| 2010/0272940 | A1 | 10/2010 | Shi et al. |
| 2013/0323368 | A1 * | 12/2013 | Santos .................. D21H 27/10 |
| | | | 426/106 |
| 2020/0172768 | A1 * | 6/2020 | Nolen ........................ C08J 5/18 |
| 2022/0144517 | A1 | 5/2022 | Salumae et al. |
| 2022/0162424 | A1 | 5/2022 | Dundar Field |
| 2023/0080039 | A1 | 3/2023 | Paslier et al. |
| 2023/0128323 | A1 | 4/2023 | Piunova et al. |
| 2024/0166853 | A1 | 5/2024 | Piunova et al. |
| 2024/0183108 | A1 | 6/2024 | Catarino et al. |

FOREIGN PATENT DOCUMENTS

| | | |
|---|---|---|
| GB | 6329340 S | 12/2023 |
| GB | 6329341 S | 12/2023 |
| GB | 6329342 S | 12/2023 |
| GB | 6329490 S | 12/2023 |
| GB | 6329491 S | 12/2023 |
| GB | 6329492 S | 12/2023 |
| GB | 6329493 S | 12/2023 |
| GB | 6329494 S | 12/2023 |
| GB | 6329495 S | 12/2023 |
| GB | 6329496 S | 12/2023 |
| IN | 430813 B | 5/2023 |
| KR | 20210061132 A | 5/2021 |
| WO | 0248199 A2 | 6/2002 |
| WO | 2013113086 A1 | 8/2013 |
| WO | 2018172781 A1 | 9/2018 |
| WO | 2020065270 A1 | 4/2020 |
| WO | 2020174234 A1 | 9/2020 |
| WO | 2021101094 A1 | 5/2021 |
| WO | 2021171016 A1 | 9/2021 |
| WO | 2022043691 A1 | 3/2022 |
| WO | 2022167933 A1 | 8/2022 |
| WO | 2022189782 A1 | 9/2022 |
| WO | 2023081848 A1 | 5/2023 |
| WO | 2023084233 A1 | 5/2023 |
| WO | 2023084239 A1 | 5/2023 |
| WO | 2023131974 A1 | 7/2023 |
| WO | 2024013518 A1 | 1/2024 |
| WO | 2024052315 A1 | 3/2024 |
| WO | 2024115916 A1 | 6/2024 |
| WO | 2024137457 A1 | 6/2024 |

OTHER PUBLICATIONS

Dungani, et al., "Reinforcing Effects of Seaweed Nanoparticles in Agar-based Biopolymer Composite: Physical, Water Vapor Barrier, Mechanical, and Biodegradable Properties," BioResources 2021, 16(3), 5118-5132.

Hasan, et aL, "Enhancement in the Physico-Mechanical Functions of Seaweed Biopolymer Film via Embedding Fillers for Plasticulture Application—A Comparison with Conventional Biodegradable Mulch Film," Polymers 2019, 11, 210.

International Search Report and Written Opinion mailed Mar. 15, 2023 for International Patent Application No. PCT/US2022/079337, 12 pages.

Marium, et al., "Production of Bio-Degradable Carrageenan-Based Films From *Soueria robusta* (Red Bamboo) of Karachi Coast By Using Glycerol and Sorbitol," International Journal of Biology and Biotechnology 2021, 18(1), 65-72.

Puscaselu et al., "The antibacterial properties of seaweed biopolymer based films incorporated with essential oils," Journal of Argoalimentary Processes and Technologies 2017, 23(3), 157-163.

Rizal, et al., "Enhanced Functional Properties of Bioplastic Films Using Lignin Nanoparticles from Oil Palm-Processing Residue," Polymers 2022, 14, 5126.

Seeta Uthaya Kumar, et aL, "Extracted Compounds from Neem Leaves as Antimicrobial Agent on the Physico-Chemical Properties of Seaweed-Based Biopolymer Films," Polymers 2020, 12, 1119.

Examination Report mailed May 30, 2024 in Australian Patent Application No. 2022379958, 4 pages.

International Search Report and Written Opinion mailed Jun. 10, 2024 for International Patent Application No. PCT/US2024/014640, 13 pages.

* cited by examiner

FLEXIBLE SEAWEED-BASED THIN FILMS AND ASSOCIATED SOLUTION CASTING SYSTEMS AND METHODS

CROSS-REFERENCE TO RELATED APPLICATIONS

The present application claims the benefit of U.S. Provisional Patent Application No. 63/483,359, filed Feb. 6, 2023, the disclosure of which is incorporated herein by reference in its entirety.

TECHNICAL FIELD

This present disclosure relates to flexible seaweed-based thin films formed via solution casting, and associated systems and methods.

BACKGROUND

Single-use plastic packaging is the most inexpensive, lightweight, durable, scalable material on earth, but it is made from petroleum, a finite resource that is environmentally damaging and lasts for centuries in landfills and in nature. The global population of more than 7 billion people produced over 320 million tons of plastic in 2016 alone, which is set to double by 2034. Rising consumer and investor awareness around plastic pollution, along with increasing governmental restrictions on single-use plastics, are forcing major brands and manufacturers to actively seek sustainable replacements. Accordingly, there exists a need for alternative packaging solutions.

BRIEF DESCRIPTION OF THE DRAWINGS

Features, aspects, and advantages of the presently disclosed technology may be better understood with regard to the following drawings.

Figure 1:
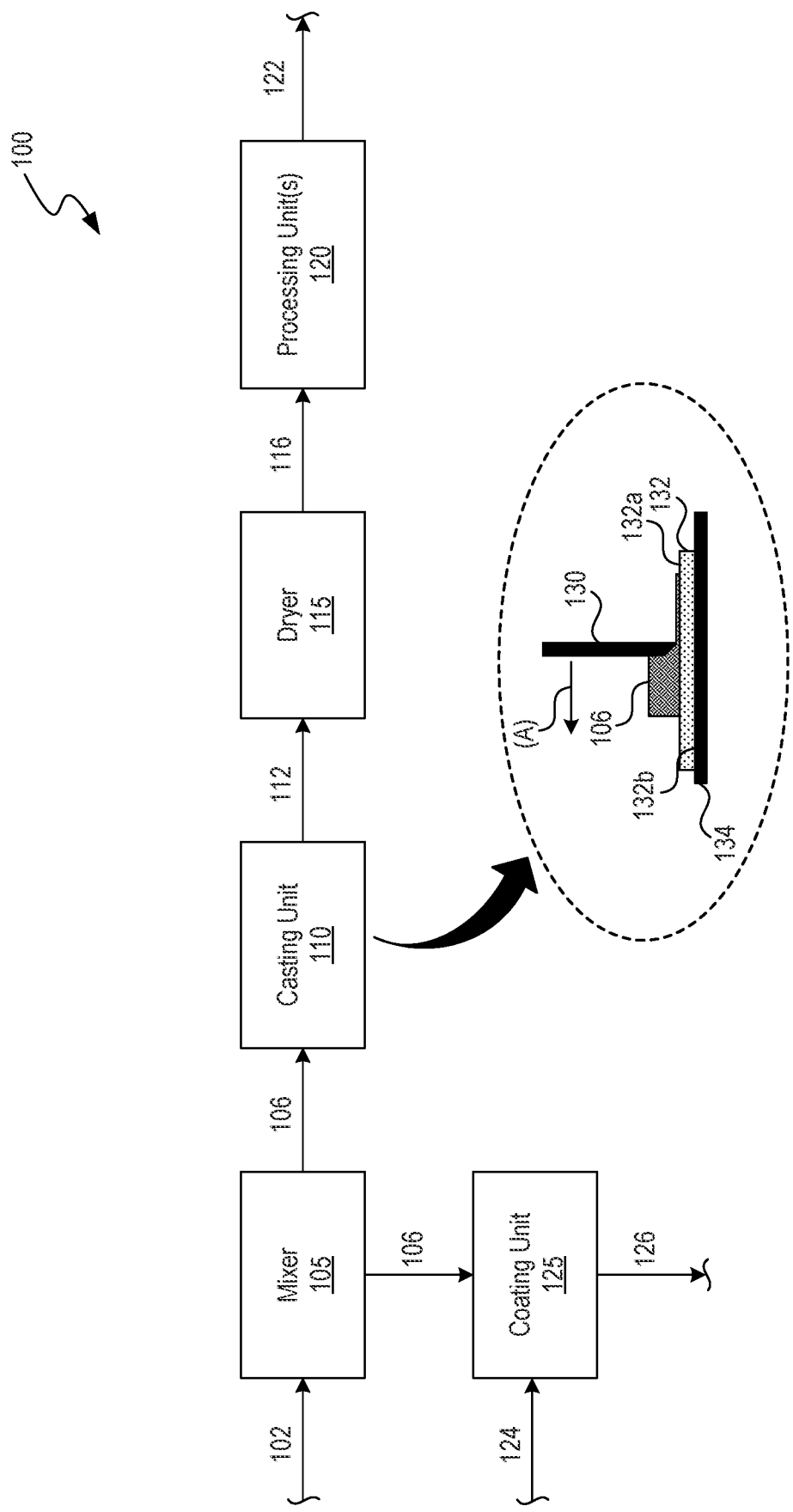
FIG. 1 is a schematic block diagram of a system for producing a seaweed-based thin film via solution casting, in accordance with embodiments of the present technology.

A person skilled in the relevant art will understand that the features shown in the drawings are schematic and for purposes of illustrations, and variations, including different and/or additional features and arrangements thereof, are possible.

DETAILED DESCRIPTION

I. Overview

Petroleum-based, single-use plastic packaging lasts for hundreds of years in landfills, and has created the need for more sustainable solutions. The most popular alternatives currently are bioplastics derived from corn and sugarcane. However, these bioplastics are often (i) dependent on monoculture crops, (ii) combined with traditional plastics or petroleum-based agents (e.g., polybutylene adipate terephthalate (PBAT)), and (iii) require commercial composting facilities to degrade them. If not disposed of properly, these alternatives to traditional plastics can take hundreds of years to degrade and thus occupy valuable space in waste facilities.

Other bioplastic materials that are biodegradable have been utilized, but do not meet the standards for a home compostable, marine safe, thin film flexible packaging material. Additionally, many of these other bioplastic materials are dependent on resource-intensive inputs that produce large amounts of waste, compete with food crops, and rely on petroleum-based binding agents. For example, degrading corn-based packaging requires treatment at industrial composting facilities at temperatures of at least 140° F. Without these facilities and/or thermal processing, degrading these types of packaging can take over 100 years to degrade naturally. As such, corn-based bioplastics still produce significant waste that pollutes systems on land and at sea.

Embodiments of the present disclosure attempt to address at least some of the above-described issues by using seaweed and biodegradable materials to form flexible thin film products, all or a portion (e.g., at least 80%, 90%, or 95%) of which can degrade naturally (e.g., with or without industrial facilities and/or thermal processing) over a relatively short period of time (e.g., less than 45 days, less than 2 months, less than 4 months, less than 6 months, or less than 1 year). For example, in some embodiments, the film product can be industrially compostable, or home compostable, e.g., as defined by ISO-14855, ASTM D6400, Australian standard AS 5810-2010, European standard EN 13432:2000, TUV Austria certification, and/or biodegradable products institute (BPI) certification.

As described herein, the present technology includes methods and systems for producing seaweed-based thin films, and can include mixing a formulation to form an aqueous mixed solution, casting the mixed solution to form a film, and drying the film to form a dried film. The dried film (e.g., the end thin film product) can include: (i) a seaweed-based composition comprising agar, alginate, carrageenan, ulvan, laminarian, semi-refined seaweed, and/or unprocessed seaweed; (ii) an agent comprising glycerin, sorbitol, sodium lignosulphonate, potassium lignosulphonate, ammonium lignosulphonate, calcium lignosulphonate, lignosulphonate, ethylene glycol, polyvinyl alcohol (PVOH), polyethylene glycol, polyglyceride fatty acid esters, guar gum, tributyl citrate, and/or propylene glycol; and (iii) water. The seaweed-based composition can comprise 50-90 wt % of the seaweed-based thin film, the agent can comprise no more than 40 wt % of the seaweed-based thin film, and the water comprises 0.1-50 wt % of the seaweed-based thin film. The dried film can be subsequently processed to form film-forming packaging products (e.g., retail bags, poly bags, bubble wrap, polymailers, pouches, wrappers, and the like), which can replace the single-use plastic packaging. By forming these end products from seaweed and/or biodegradable materials and combining the materials in a manner that enables them to be processed, products formed via embodiments of the present technology can be home compostable, nontoxic, and/or marine safe. Moreover, such products can biodegrade within months in a compost environment into nutrients that promote healthy soil and without the need for industrial processing. In such embodiments, the compost environment is defined by characteristics including aeration or aerobic conditions, moisture content (e.g., between 50-60%), temperature (e.g., less than 50° C.), and carbon: nitrogen ratio (e.g., a ratio between 20-30). Additionally, embodiments of the present technology have desirable characteristics for use in flexible film packaging, including tensile strength, heat-sealability, transparency, impact resistance, moisture resistance, strain at break, density, heat resistance, and flexible durability, amongst other characteristics. These and other details are disclosed in U.S. patent application Ser. No. 18/052,875, filed Nov. 4, 2022, the disclosure of which is attached as Appendix A and incorporated herein by reference in its entirety.

Aspects of the present disclosure are directed generally to compostable seaweed-based compositions, and associated methods and systems. Specific details of several embodiments of the present technology are described herein with reference to FIGS. 1 and 2. The present technology, however, can be practiced without some of these specific details. In some instances, well-known structures and techniques often associated with solution casting, have not been shown in detail so as not to obscure the present technology. Moreover, although many of the embodiments are described below with respect to systems and methods for creating thin film plastic-like material from seaweed-based materials via solution casting, other applications and other embodiments in addition to those described herein are within the scope of the technology. For example, one of ordinary skill in the art will understand that one or more aspects of the present technology are applicable to creating other substrates and/or packaging materials with seaweed-based materials and/or using other types of processing methods, such as blown film extrusion, tubing extrusion, over jacketing extrusion, coextrusion, extrusion coating, injection molding, thermoforming, blow molding, and/or other suitable material processing methods.

The terminology used in the description presented below is intended to be interpreted in its broadest reasonable manner, even though it is being used in conjunction with a detailed description of certain specific embodiments of the disclosure. Certain terms can even be emphasized below. However, any terminology intended to be interpreted in any restricted manner will be overtly and specifically defined as such in this Detailed Description section.

In the Figures, identical reference numbers identify generally similar, and/or identical, elements. The features shown in the Figures are schematic and thus merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Select Embodiments of Seaweed-Based Thin Films, and Associated Methods and Systems FIG. 1 is a schematic block diagram of a system 100 for producing a seaweed-based thin film via solution casting, in accordance with embodiments of the present technology. The system 100 can include a mixer 105 configured and/or positioned to receive and mix a formulation 102 to produce an aqueous mixed solution 106. The formulation 102 can comprise a seaweed-based compound, a film-forming material or agent ("agent"), and water. In some embodiments, the formulation 102 comprises a solids content of at least 7 wt %, 10 wt %, 15 wt %, 16 wt %, 17 wt %, 18 wt %, 19 wt %, 20 wt %, 25 wt %, 30 wt %, 35 wt %, or within a range of 7-35 wt %, 10-35 wt %, or 15-35 wt %. The mixer 105 can include an extruder (e.g., a single or twin-screw extruder) or other mixing vessel commonly used in solution casting applications, and mixing can occur in a continuous or batch manner. In some embodiments, mixing occurs at a predetermined temperature (e.g., at least 160° F., 170° F., or 180° F.), which can limit gelling and/or lumping that leads to uneven films. Mixing times can be approximately 30-45 minutes, but can vary depending on scale and the specific components of the formulation 102.

The seaweed-based compound of the formulation 102 can comprise hydrocolloids and/or phycocolloids, which as used herein can be interpreted to include processed seaweed and/or extracted phycocolloids (e.g., agar, alginate, ulvan, laminarian, and/or carrageenan (e.g., kappa, iota, and/or lambda)). In some embodiments, the phycocolloids can include semi-refined seaweed, unprocessed seaweed, dry seaweed powder, and/or chemically-modified phycocolloids, as described herein. The unprocessed seaweed can include brown seaweed (e.g., saccharina or macrocystis), red seaweed (e.g., palmariaceae or gracilariaceae), green seaweed (e.g., sea chlorophyta and charophyta), cut giant kelp and/or milled kappaphycus. In some embodiments the unprocessed seaweed is in powder form (e.g., brown seaweed powder, red seaweed powder, green seaweed powder).

The chemically-modified phycocolloids can include seaweed that undergoes pre-processing prior to mixing with the agents, e.g., to make the seaweed more suitable for downstream thermal processing (e.g., heat sealing, compounding and/or extrusion) and less hygroscopic and/or hydrophilic. For example, such seaweed can undergo modification including polymerization, esterification, polyester grafting, acetylation, hydroxypropylation, and/or carboxymethylation. In such embodiments, the chemically-modified phycocolloid can include an ester functional group, a polyester functional group, an acetyl functional group, a hydroxypropyl functional group, and/or a carboxymethyl functional group. Additionally or alternatively, in such embodiments, hydroxyl groups can be altered on the polysaccharide structure of the seaweed and/or be replaced, e.g., with esters or other groups, to make the structure more thermoplastic, and thus obtain a more desirable melting profile and/or viscosity, among other beneficial characteristics. The chemically-modified phycocolloids can be formed by reacting a base phycocolloid (i.e., unprocessed phycocolloids, agar, alginate, and/or carrageenan) with molecules susceptible to ester bond formation and polyester grafting in bulk or water solutions at predetermined temperatures (e.g., at least 100° C., 110° C., 120° C., or 130° C.). The produced chemically-modified phycocolloid can include the base phycocolloid and the modifying molecule(s) (e.g., a polymer compound). The modifying molecule(s) are susceptible to ester bond formation and polyester grafting, and can comprise caprolactone, glycolic acid, lactic acid, lactide, acetic anhydride, ethyl lactate, lecithin, unsaturated fatty acids, saturated fatty acids, acetyl chloride, succinic acid, ethyl acetate, adipic acid anhydride, and/or propylene oxide.

The seaweed-based compound of the formulation 102 can include a protein content of at least 0.1 wt %, 3 wt %, 5 wt %, 8 wt %, 10 wt %, 15 wt %, 20 wt %, 30 wt %, 40 wt %, or within a range of 0.1-40 wt %, 0.1-15 wt %, 3-40 wt %, 5-40 wt %, 10-30 wt %, or 15-30 wt %. Certain seaweeds (e.g., extracted phycocolloids) tend be relatively low in protein content (e.g., less than 0.1% or 2% by weight) and relatively high in carbohydrate content (e.g., structural carbohydrates and/or storage carbohydrates such as starch) which, unless chemically modified, can be relatively stiff with high melting and glass transition temperatures, may not behave like thermoplastic polymers. As a result, such seaweeds with relatively lower protein content can be more difficult to use as an input for thermal processing (e.g., heat seal performance) or processing may be difficult (e.g., require more time, additional drying steps, tighter tolerances for drying) without introducing the agents disclosed herein.

Unprocessed seaweed with relatively high protein content can have higher levels of bioavailable nitrogen and phosphorous, which, when used with the polymers disclosed herein, can enhance the rate at which biodegradation of the end product occurs. As a result, utilizing seaweed with higher protein content can enable biodegradation in non-industrial and other environments, such as the compost environments described previously. The relatively high protein content can also enable the seaweed to be more processable, such that the seaweed is more flexible and responds better to thermal processing such as film formation and heat seal performance. By combining the unprocessed seaweed with low protein-containing seaweed (such as phycocolloids) prior to mixing with the additives and/or using higher protein seaweed, embodiments of the present technology can enable formation of an end product (e.g., the thin film composition described herein) with more desirable characteristics. Embodiments of the present technology overcome some of the challenges of using unprocessed seaweed (e.g., ocean smell, lack of stiffness and strength) by combining the processed seaweeds and appropriate agents. In some embodiments, higher protein seaweed can have a glass transition temperature lower than a thermal degradation temperature of the higher protein seaweed, thereby enabling the seaweed material to soften and flow better during heat seal formation. The glass transition temperature, thermal degradation temperature, and related characteristics of the seaweed can be measured via thermogravimetric analysis (TGA) and/or differential scanning calorimetry (DSC) analysis.

The use of phycocolloids comprising unprocessed seaweeds can make processing more difficult and/or impart undesirable characteristics to the end product, and thus prevent their use. For example, unprocessed seaweeds bring oceanic smells, can generate unwanted coloration reactions that make the end product/film less transparent and/or unwanted cross-linking that make the end product/film more brittle at elevated temperatures. Embodiments of the present technology are able to overcome these deficiencies based on a unique composition or combination of the seaweed-based compound and agents, and processing the unique composition at predetermined solution/melt-processing temperatures.

The agent of the formulation 102 can comprise glycerin, sorbitol, sodium lignosulphonate, potassium lignosulphonate, calcium lignosulphonate, ammonium lignosulphonate, lignosulphonate, citric acid, ascorbic acid, ethylene glycol, polyvinyl alcohol (PVOH), polyethylene glycol, polyglyceride fatty acid esters, guar gum, tributyl citrate, and/or propylene glycol. Additionally or alternatively, the agent can include a plasticizer, a viscosity enhancer, a cross linker, a slip agent, an anti-block additive, an antioxidant, a thermal stabilizer, a processing aid, an odor absorber, and/or other materials configured to enable the formulation 102 to be processed more effectively. Other agents can enable the end thin film product to be softer and/or more flexible to increase its plasticity, decrease its viscosity, and/or decrease friction during its handling in manufacture. The plasticizer can include a hydrophilic plasticizer, a hydrophobic plasticizer, glycerin, polyglycerin, polyglyceride fatty acid esters, guar gum, sorbitol, tributyl citrate, ethylene glycol, water, and/or propylene glycol. The viscosity enhancer can provide for a consistent and stable viscosity to enable a desirable melt flow profile of the resulting solutions across a wide range of temperatures. The cross linker can include an additive which links two polymer chains via a covalent or ionic bond, and can include calcium chloride, calcium bromide, calcium fluoride, magnesium chloride, magnesium bromide, and/or magnesium fluoride. The slip agent can include products which can be added to films to control friction, and can include a plant-based slip agent, lecithin, stearates, fatty acids, erucamide, oleamides, oleyl palmitamide, stearyl erucamide, behenamide, stearamide, ethylene bis-oleamide, and/or ethylene bis-stearamide. The anti-block additive of the additives can provide a barrier that limits contact between adjacent plastic film surfaces, and can include inorganic minerals (e.g., calcined kaolin, cristobalite, precipitated silica, diatomaceous earth, mica, talc, calcium carbonate, calcium sulfate (anhydrite), magnesium carbonate, magnesium sulfate, feldspar, and/or titanium dioxide) and/or organic alternatives (e.g., amides, fatty acid amides, fatty acids, salts of fatty acids, and/or silicones). The odor absorber of the additives can neutralize industrial odors and/or limit harmful emissions. The odor absorbers can include vanillin, copper chlorophyllin, spearmint, peppermint, cedarwood, essential oils, and/or an inorganic antimicrobial additive. The agent of the formulation 102 can also include other bio-based materials, such as wood pulp fibers, cassava starch, hemp, flax, rice, and/or sugar. These bio-based materials can, among other qualities, improve properties of the mixed solution 106 for downstream processing, lower the corresponding carbon footprint, and/or improve nutritional value of the resulting thin film end product after natural or industrial degradation.

The system 100 can further include a casting unit 110 downstream of the mixer 105. The casting unit 110 is configured and/or positioned to receive the mixed solution 106 and form a film 112 therefrom. The casting unit 110 can include a substrate 132 with a front or primary surface 132a onto which the mixed solution 106 is poured. A blade or similar member 130 spaced apart from the substrate 132 by a predetermined distance can move over the mixed solution in a lateral direction (as indicated by the arrow (A) of FIG. 1) relative to the substrate 132 to form the film 112 with a predetermined thickness, e.g., of no more than 50 mils, 45 mils, 40 mils, 35 mils, 30 mils, 25 mils, 20 mils, 15 mils, 10 mils, or within a range of 10-50 mils. In some embodiments, the casting unit 110 can include a cooling component 134 (also referred to as a "cooling film," a "backing material," or the like) configured to cool the mixed solution 106 and/or film 112. In some embodiments, the cooling component 134 is disposed over a back or secondary surface 132b of the substrate 132 such that the substrate 132 is positioned between the cooling component 134 and the mixed solution 106, with the mixed solution 106 disposed on the front surface 132a of the cooling component 134. The cooling component 134 can be cooled (e.g., to be less than 50° F., 45° F., 40° F., 35° F., or within a range of 35-50° F.) using a cooling medium (e.g., water or a coolant) that is circulated, e.g., through the cooling component or against the back surface 132b of the substrate 132. In operation, the cooling component 134 can cool the mixed solution 106 upon contact, and as a result provides faster gelation to improve properties of the film 112 or downstream dried film.

The system 100 can further include a coating unit 125 downstream of the mixer 105. In some embodiments, the coating unit 125 is configured and/or positioned to receive at least a portion of the mixed solution 106 and form a coated substrate (e.g., a laminate structure) 126 therefrom. The mixed solution 106 can be coated onto a variety of backing materials 124 to generate the coated substrate 126. The backing materials 124 may also be known as "carrier films" or "substrates" (e.g., Kraft paper, cardboard paper, recycled paper, tissue paper and other wood fiber-based products, polyvinyl alcohol (PVOH), polyester (e.g., PLA, PBS, PET, PBAT etc.), polyolefin (e.g., LDPE, PP, etc.) films). The resulting coated substrate 126 can comprise at least 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, 99 wt %, or within a range of 5-99 wt % of the formulation 102. The mixed solution 106 can be coated or otherwise applied to the baking material 124 and/or other substrate via lamination and/or various coating techniques, including spray coating, dip coating, spin coating, slot-die coating, doctor blading, or bar coating at any given solids content. In some embodiments, the mixed solution 106 can be formulated and applied in a manner that results in an oxygen barrier coating. The backing materials can comprise a heat-sealable layer. In some embodiments, the resulting coated substrate 126 comprises 90-99 wt % of the formulation 102 and 1-10 wt % of a PVOH substrate. In some embodiments, the resulting coated substrate 126 comprises 95-99 wt % of the formulation 102 and 1-5 wt % of a PVOH substrate. The PVOH can be a heat-sealable layer. In other embodiments, the resulting coated substrate 126 comprises 1-10 wt % of the formulation 102 and at least 90-99 wt % of a paper substrate. The formulation 102 can be an oxygen barrier coating.

The system 100 can further include a dryer 115 downstream of the casting unit 110. The dryer 115 is configured and/or positioned to receive the film 112 and produce a dried film 116. The dryer 115 can operate for at least 10 or 15 minutes, and heat the film 112 at or to a temperature of at least 160° F., 170° F., 180° F., 190° F., 200° F., or within a range or 160-200° F. or 165-195° F. In some embodiments, the dryer 115 operates based on a predetermined profile, e.g., by heating the film 112 at a first temperature (e.g., at least 260° F.), and then heating the film 112 at a second temperature (e.g., no more than 190° F.) less than the first temperature. Without being bound by theory, heating the film 112 at a higher temperature initially, followed by a lower temperature, can generate cross-linking within the film 112 and enable a stronger downstream film. The dried film 116 can have a solids content of at least 85 wt %, 90 wt %, or 95 wt %. Additionally or alternatively, the dried film 116 can have a thickness of no more than 10 mils, 8 mils, 6 mils, 5 mils, 4 mils, 3 mils, 2 mils, 1 mil, 0.5 mil, or 0.1 mil, or within a range of 0.1-10 mils.

The dried film 116 can correspond to the seaweed-based thin film described herein, and can include the seaweed-based composition, agent, and water, as described above. In some embodiments, the seaweed-based composition comprises 50-90 wt % of the seaweed-based thin film, the agent comprises no more than 40 wt % of the seaweed-based thin film, and the water comprises 0.1-50 wt % of the seaweed-based thin film. In some embodiments, the seaweed-based composition comprises or consists essentially of agar, and the agent comprises or consists essentially of glycerin and natural colorants, wherein the agar comprises 70-75 wt % of the seaweed-based thin film, the glycerin comprises 25-30 wt % of the seaweed-based thin film, and the natural colorants comprise 0.1-5 wt % of the seaweed-based thin film. In some embodiments, the seaweed-based composition comprises or consists essentially of agar, wherein the agar comprises 50-80 wt % of the seaweed-based thin film, and the agent comprises 20-40 wt % of the seaweed-based thin film. In some embodiments, the seaweed-based composition comprises or consists essentially of agar and unprocessed seaweed, and the agent comprises glycerin and/or sorbitol, wherein the agar comprises 50-80 wt % of the seaweed-based thin film, the unprocessed seaweed comprises 0.5-20 wt % of the seaweed-based thin film, and the agent comprises 20-40 wt % of the seaweed-based thin film. In some embodiments, the seaweed-based composition comprises or consists essentially of agar and unprocessed seaweed, and the agent comprises glycerin and sorbitol, wherein the agar comprises 50-80 wt % of the seaweed-based thin film, the unprocessed seaweed comprises 1-10 wt % of the seaweed-based thin film, the glycerin comprises 20-30 wt % of the seaweed-based thin film, and the sorbitol comprises no more than 10 wt % of the seaweed-based thin film. In some embodiments, the agent comprises glycerin and at least one of lignosulphonate, dextran or starch, wherein the glycerin comprises 15-30 wt % of the seaweed-based thin film, the at least one of lignosulfonate, dextran or starch comprises no more than 40 wt % of the seaweed-based thin film, and the seaweed-based compound (e.g., seaweed polysaccharides) comprises 30-85 wt % of the seaweed-based thin film.

The dried film 116 can be a flexible film that is transparent, heat-sealable, and/or foldable. For example, the dried film 116 can be heat sealable at 100-160° C., 110-160° C., 110-150° C., 130-160° C., or 130-150° C. Additionally or alternatively, the dried film 116 can have a heat seal strength (e.g., according to ASTM F88) of no more than 0.01 Newtons (N)/millimeter (mm), 0.02 N/mm, 0.03 N/mm, 0.04 N/mm, 0.05 N/mm, 0.1 N/mm, 0.2 N/mm, 0.3 N/mm, 0.4 N/mm, 0.5 N/mm, 0.6 N/mm, 0.7 N/mm, 0.8 N/mm, 0.9 N/mm, 1 N/mm, 2 N/mm, 5 N/mm, or 10 N/mm.

The dried film 116 can include a protein content of at least 0.01 wt %, 0.1 wt %, 3 wt %, 5 wt %, 8 wt %, 10 wt %, 15 wt %, 20 wt %, 30 wt %, 40 wt %, or within a range of 0.01-40wt %, 0.1-40 wt %, 0.1-15 wt %, 3-40 wt %, 5-40 wt %, 10-30 wt %, or 15-30 wt %. An increased seaweed content of the product can be directly correlated with improved biodegradability, improved ability for home composting, and overall regenerative nature of the product. The dried film 116 can be biodegradable per ISO 14855, compostable per ASTM certification or TUV Austria certification, and/or configured to degrade over a period of no more than 1 month, 2 months, 3 months, 4 months, 5 months, or 6 months, e.g., in a home compostable environment. As used herein, "biodegradable" or "biodegradation" should be interpreted to mean that at least 90% biodegradation of a sample occurs within 12 months in home compost conditions and/or within 6 months in industrial compost conditions. "Compostable" or "compost disintegration" should be interpreted to mean that at least 81% biodegradation of a sample occurs within 6 months in home compost conditions and/or at least 90% biodegradation occurs within 12 weeks in industrial compost conditions. Additionally or alternatively, the product can have a density of at least 0.5 g/cm$^3$, 1.0 g/cm$^3$, 1.5 g/cm$^3$, or within a range of 0.5-1.6 g/cm$^3$, 1.0-1.6 g/cm$^3$, or 1.3-1.6 g/cm$^3$. The composting and biodegradation conditions can include anaerobic digestion at thermophilic (e.g., 52° C.) or mesophilic (e.g., 37° C.) conditions, and 90% degradation of a given sample is generally considered completely biodegradable. Composting conditions can include maximum degradation profiles and average temperatures for aerobic conditions (digestion) at either 20-35° C. (home composting) or 50-90° C. (industrial composting), where the lowest measured temperatures can be as low as 10-15° C. The composting conditions can include frequent aeration by "turning" of windrows or other techniques for aeration of the compost piles, as well as stagnant aerobic conditions. The compost pH values can range from 3-10 typically depending on the type of compost and measure point, with commonly reported best performance at pH range of 6-8 and 5-9.

The dried film 116 can have a tensile strength (e.g., accordingly to ASTM D882) of at least 5 megapascals (MPa), 10 MPa, 15 MPa, 20 MPa, 25 MPa, 30 MPa, 35 MPa, 40 MPa, 45 MPa, 50 MPa, or within a range of 5-50 MPa. Tensile strength can be measured via electromechanical testing machines manufactured by Instron of Norwood, Massachusetts, e.g., as defined by ASTM D882 and/or ISO 527, which requires a relative humidity of 50% and a temperature of 23° C., and/or at a 20 millimeter/minute rate. Tensile strength of at least 10 MPa for flexible film packaging, including packaging that is home compostable, can help ensure the packaging can support additional loads without rupturing or tearing.

The dried film 116 can have a strain at break (e.g., according to ASTM D882) of at least 10%, 20%, 30%, 40%, 50%, 60%, 70%, 80%, 90%, 100%, or within a range of 10-100% at a 20 mm/minute rate. Strain at break can be measured via electromechanical testing machines manufactured by Instron of Norwood, Massachusetts, e.g., as defined by ASTM D882 and/or ISO 527, which requires a relative humidity of 50% and a temperature of 23° C.

The dried film 116 can have a stiffness or modulus (e.g., according to ASTM D882) of at least 150 MPa, 200 MPa, 250 MPa, 300 MPa, 350 MPa, 400 MPa, 450 MPa, 500 MPa, 600 MPa, 700 MPa, 800 MPa, 900 MPa, 1000 MPa, or within a range of 150-1000 MPa. Stiffness or modulus can be measured via electromechanical testing machines manufactured by Instron of Norwood, Massachusetts, e.g., as defined by ASTM D882 and/or ISO 527, and/or at a 20 millimeter/minute rate. A stiffness or modulus of at least 100 MPa for flexible film packaging, including packaging that is home compostable, can help ensure the packaging can sufficiently withstand excess plastic deformation to the point of fracturing but also function through conventional converting machinery.

The dried film 116 can exhibit favorable swelling (e.g., wet mass divided by dry mass) characteristics. For example, when in a salt concentration of at least 900 microSiemens, the dried film 116 can exhibit a degree of swelling of no more than 200%, and/or when in a salt concentration of less than 900 microSiemens, the dried film 116 can exhibit a degree of swelling of no more than 300%.

The dried film 116 can have a moisture vapor transmission rate (WVTR) of no more than 2000 g/m2/day, 1500 g/m2/day, 1000 g/m$^2$/day, 500 g/m$^2$/day, 250 g/m$^2$/day, 100 g/m$^2$/day, 50 g/m$^2$/day, 25 g/m$^2$/day, 10 g/m$^2$/day, or within a range of 10-2000 g/m$^2$/day. WVTR can be measured via a MOCON WVTR Permeation Analyzer, e.g., as defined by ASTM F1249 and/or ISO 15106-2. A WVTR less than 10 g/m$^2$/day for flexible film packaging, including packaging that is home compostable, can help ensure water vapor permeation through the packaging is sufficiently limited, e.g., to not damage package contents.

In some embodiments, the dried film 116 is or can be further processed to be a roll of flexible film, which may be further processed into other products. As such, the system 100 can further include one or more processing units 120 configured and/or positioned to receive the dried film 116 and produce a packaging material 122. The packaging material 122 can include a product window, shopping bag, poly bag, bubble wrap, polymailer, pouch, sachet, shrink film, cling wrap, or wrapper.

In some embodiments, the wet film 112 and/or the dried film 116 is water soluble in cold water above 1° C. and/or room tempered water (e.g., around 23° C.). In such embodiments, the wet film 112 and/or the dried film 116 can be composed of a seaweed-based composition (e.g., 10-60 wt %) including alginates, iota-carrageenan, lambda-carrageenan and/or kappa-carrageenan, with the iota-carrageenan and/or lambda-carrageenan comprising at least 10 wt %. The wet film 112 and the dried film 116 of such compositions are water soluble at temperature below 30° C. and can act as thin film packaging for different media, including laundry detergent and soaps. In such conditions, the wet film 112 can disintegrate within 24 hours, e.g., irrespective of the electrolyte concentration of the water. Additionally or alternatively, the wet film 112 can have a degree of swelling of at least 300% and a solid content or no more 0.5 wt %.

Figure 2:
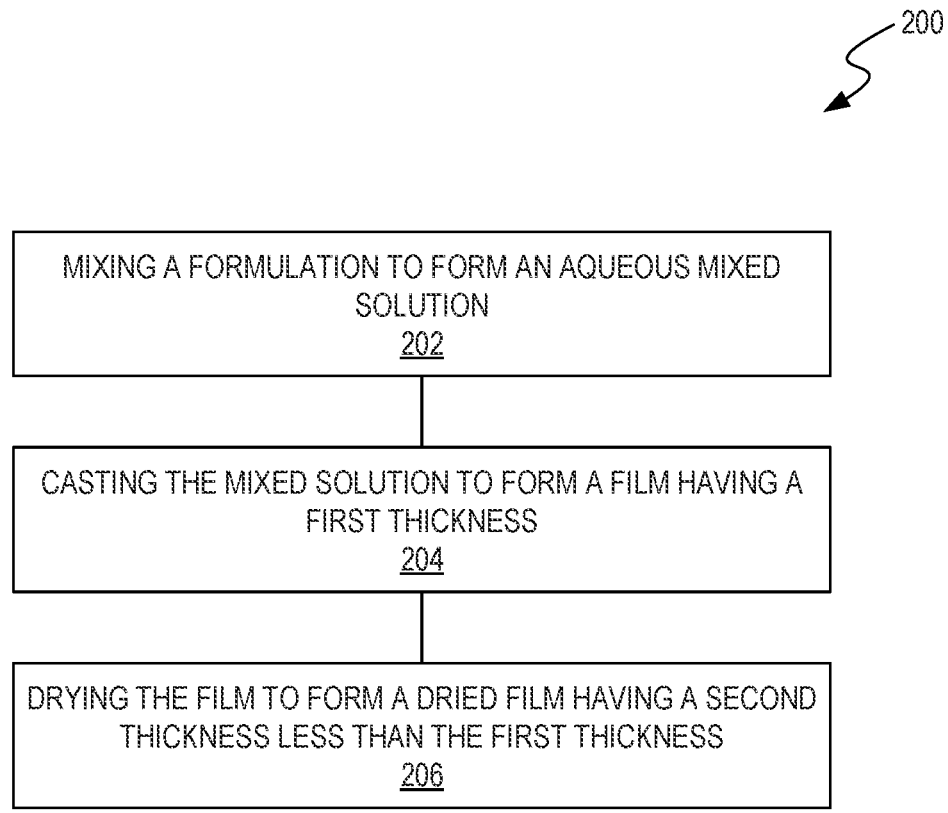
FIG. 2 is a flow diagram of a method for producing a seaweed-based thin film via solution casting, in accordance with embodiments of the present technology.

FIG. 2 is a flow diagram of a method 200 for producing a seaweed-based thin-film via solution casting, in accordance with embodiments of the present technology. The method 200 can include mixing a formulation (e.g., the formulation 102; FIG. 1) to form an aqueous mixed solution (e.g., the mixed solution 106; FIG. 1) (process portion 202). The formulation can comprise a seaweed-based composition, an agent, and water, as described with reference to FIG. 1. As such, the formulation can comprise (i) a seaweed-based compound comprising agar, alginate, carrageenan, semi-refined seaweed, and/or unprocessed seaweed; (ii) an agent comprising glycerin, sorbitol, sodium lignosulphonate, potassium lignosulphonate, calcium lignosulphonate, ammonium lignosulphonate, lignosulphonate, citric acid, ascorbic acid, lignosulphonate, ethylene glycol, polyvinyl alcohol (PVOH), polyethylene glycol, polyglyceride fatty acid esters, guar gum, tributyl citrate, and/or propylene glycol; and (iii) water. Additionally or alternatively, the formulation can comprise a solids content of at least 25 wt %. As described with reference to FIG. 1, mixing the formulation can occur at a predetermined temperature (e.g., at least 160° F., 170° F., or 180° F.) and for a predetermined time.

The method 200 can further comprises casting the mixed solution to form a film (e.g., the film 112; FIG. 1) having a first thickness (process portion 204). Casting the mixed solution can include pouring the mixed solution over a casting unit (e.g., the casting unit 110; FIG. 1) and drawing a member over the poured mixed solution to form the film. The casting unit, or backing material of the casting unit, cools the mixed solution to form the film with the first thickness. In some embodiments, the first thickness is no more than 50 mils or 20-50 mils.

The method 200 can further comprises drying the film to form a dried film (e.g., the dried film 116; FIG. 1) having a second thickness less than the first thickness (process portion 206). Drying the film can take place in a dryer (e.g., the dryer 115; FIG. 1), and be based on the heating profile described with reference to FIG. 1. For example, drying can comprise drying the film at or to a temperature of 160-195° F. In some embodiments, drying comprises (i) drying the film at or to a first temperature (e.g., at least 260° F.), and (ii) then drying the film at or to a second temperature (e.g., no more than 190° F.), which can enable cross linking and improve strength characteristics of the dried film.

The method 200 can further comprise rolling the dried film to form a film roll and forming packaging from the film roll. The packaging can include a product window, shopping bag, poly bag, bubble wrap, polymailer, pouch, sachet, shrink film, cling wrap, or wrapper. In some embodiments, an edge of the packaging is thicker than other portions of the packaging.

III. Conclusion

It will be apparent to those having skill in the art that changes may be made to the details of the above-described embodiments without departing from the underlying principles of the present disclosure. In some cases, well-known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the terms "comprising," "including," and "having" should be interpreted to mean including at least the recited feature(s) such that any greater number of the same feature and/or additional types of other features are not precluded.

Reference herein to "one embodiment," "an embodiment," "some embodiments," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations, shear strength, and other numerical values used in the specification and claims, are to be understood as being modified in all instances by the term "about." Accordingly, unless indicated to the contrary, the numerical parameters set forth in the preceding specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below. Various examples of aspects of the present technology are described as numbered clauses (1, 2, 3, etc.) for convenience. These are provided as examples and do not limit the present technology. It is noted that any of the dependent examples may be combined in any combination, and placed into a respective independent example. The other examples can be presented in a similar manner.

1. A seaweed-based thin film, comprising:
   a seaweed-based composition comprising agar, alginate, carrageenan, semi-refined seaweed, and/or unprocessed seaweed;
   an agent comprising glycerin, sorbitol, sodium lignosulphonate, potassium lignosulphonate, calcium lignosulphonate, ammonium lignosulphonate, lignosulphonate, ascorbic acid, citric acid, ethylene glycol, polyethylene glycol, polyglyceride fatty acid esters, guar gum, tributyl citrate, erucamide, calcium carbonate, propylene glycol, natural colorants, and/or odor absorbers; and
   water,
   wherein:
      the seaweed-based composition comprises 50-90 wt % of the seaweed-based thin film,
      the agent comprises no more than 40 wt % of the seaweed-based thin film, and
      the water comprises 0.1-50 wt % of the seaweed-based thin film.

2. The seaweed-based thin film of any one of the clauses herein, wherein the seaweed-based composition consists essentially of agar and the agent consists essentially of glycerin and natural colorants, and wherein:
   the agar comprises 70-75 wt % of the seaweed-based thin film,
   the glycerin comprises 25-30 wt % of the seaweed-based thin film, and
   the natural colorants comprise 0.1-5 wt % of the seaweed-based thin film.

3. The seaweed-based thin film of any one of the clauses herein, wherein the seaweed-based composition consists essentially of agar, and wherein:
   the agar comprises 50-80 wt % of the seaweed-based thin film, and
   the agent comprises 20-40 wt % of the seaweed-based thin film.

4. The seaweed-based thin film of any one of the clauses herein, wherein the seaweed-based composition comprises agar and unprocessed seaweed and the agent comprises glycerin and/or sorbitol, and wherein:
   the agar comprises 50-80 wt % of the seaweed-based thin film,
   the unprocessed seaweed comprises 0.5-20 wt % of the seaweed-based thin film, and
   the agent comprises 20-40 wt % of the seaweed-based thin film.

5. The seaweed-based thin film of any one of the clauses herein, wherein the seaweed-based composition consists essentially of agar and unprocessed seaweed and the agent comprises glycerin and/or sorbitol, and wherein:
   the agar comprises 50-80 wt % of the seaweed-based thin film,
   the unprocessed seaweed comprises 1-20 wt % of the seaweed-based thin film, and the agent comprises 20-40 wt % of the seaweed-based thin film.

6. The seaweed-based thin film of any one of the clauses herein, wherein the seaweed-based composition comprises agar and unprocessed seaweed and the agent comprises glycerin and sorbitol, and wherein:
the agar comprises 50-80 wt % of the seaweed-based thin film,
the unprocessed seaweed comprises 1-20 wt % of the seaweed-based thin film,
the glycerin comprises 20-30 wt % of the seaweed-based thin film, and
the sorbitol comprises no more than 10 wt % of the seaweed-based thin film.

7. The seaweed-based thin film of any one of the clauses herein, wherein the seaweed-based composition consists essentially of agar and unprocessed seaweed and the agent consists essentially of glycerin and sorbitol, and wherein:
the agar comprises 50-80 wt % of the seaweed-based thin film,
the unprocessed seaweed comprises 1-20 wt % of the seaweed-based thin film,
the glycerin comprises 20-30 wt % of the seaweed-based thin film, and
the sorbitol comprises no more than 10 wt % of the seaweed-based thin film.

8. The seaweed-based thin film of any one of the clauses herein, wherein the seaweed-based composition comprises agar and the agar is 50-80 wt % of the seaweed-based thin film.

9. The seaweed-based thin film of any one of the clauses herein, wherein the seaweed-based composition includes unprocessed seaweed and the unprocessed seaweed is 0.5-20 wt % of the seaweed-based thin film.

10. The seaweed-based thin film of any one of the clauses herein, wherein the agent includes glycerin and the glycerin is 20-40 wt % of the seaweed-based thin film.

11. The seaweed-based thin film of any one of the clauses herein, wherein the agent includes sorbitol and the sorbitol is no more than 10 wt % of the seaweed-based thin film.

12. The seaweed-based thin film of any one of the clauses herein, wherein the seaweed-based composition includes agar and unprocessed seaweed, wherein the unprocessed seaweed includes brown seaweed powder.

13. The seaweed-based thin film of any one of the clauses herein, wherein the agent comprises glycerin and at least one of lignosulphonate, dextran or starch, and wherein the seaweed-based composition comprises agar.

14. The seaweed-based thin film of any one of the clauses herein, wherein the agent comprises glycerin and at least one of lignosulphonate citric acid, calcium carbonate, erucamide, lecithin, and wherein the seaweed-based composition comprises agar.

15. The seaweed-based thin film of any one of the clauses herein, wherein the agent comprises 15-30% glycerin and at least one of lignosulphonate, citric acid, calcium carbonate, erucamide, lecithin.

16. The seaweed-based thin film of any one of the clauses herein, wherein, when in a salt concentration of less than 900 microSiemens, the thin film composition exhibits a degree of swelling of no more than 300%.

17. The seaweed-based thin film of any one of the clauses herein, wherein: when in a salt concentration of more than 900 microSiemens, the thin film composition exhibits a degree of swelling of no more than 200%.

18. The seaweed-based thin film of any one of the clauses herein, wherein:
when in a salt concentration of more than 900 microSiemens, the thin film composition exhibits a degree of swelling of no more than 200%, and
when in a salt concentration of less than 900 microSiemens, the thin film composition exhibits a degree of swelling of no more than 300%.

19. The seaweed-based thin film of any one of the clauses herein, wherein the seaweed-based thin film is made via solution casting.

20. The seaweed-based thin film of any one of the clauses herein, wherein the seaweed-based thin film is compostable as to guidelines set by ASTM D6400 or TUV Austria certification.

21. The seaweed-based thin film of any one of the clauses herein, wherein the seaweed-based thin film has a thickness of 0.1-5 mils.

22. The seaweed-based thin film of any one of the clauses herein, wherein the seaweed-based thin film is heat sealable at 100-160° C., 110-160° C., 110-150° C., 130-160° C., or 130-150° C.

23. The seaweed-based thin film of any one of the clauses herein, wherein the seaweed-based thin film has a heat seal strength according to ASTM F88 of no more than 0.05 N/mm, 0.1 N/mm, 0.2 N/mm, 0.3 N/mm, 0.4 N/mm, 0.5 N/mm, 0.6 N/mm, 0.7 N/mm, 0.8 N/mm, 0.9 N/mm, 1 N/mm, 2 N/mm, 5 N/mm, 10 N/mm.

24. The seaweed-based thin film of any one of the clauses herein, wherein the seaweed-based thin film has a strain-at-break of at least 10%, 15%, 20%, 25%, 30%, 35%, 40%, 45%, or 50% in tensile testing according to ASTM D882 at a 20 millimeter/minute rate.

25. The seaweed-based thin film of any one of the clauses herein, wherein the seaweed-based thin film has a strength of at least 5 Megapascals (MPa), 10 MPa, 15 MPa, 20 MPa, 25 MPa, 30 MPa, or 40 MPa in tensile testing according to ASTM D882 at a 20 millimeter/minute rate.

26. The seaweed-based thin film of any one of the clauses herein, wherein the seaweed-based thin film has a stiffness or elastic modulus of at least 150 (Megapascals) MPa, 200 MPa, 250 MPa, 300 MPa, 350 MPa, 400 MPa, 450 MPa, 500 MPa, 600 MPa, 700 MPa, 800 MPa, 900 MPa, or 1000 MPa in tensile testing according to ASTM D882 at a 20 millimeter/minute rate.

27. The seaweed-based thin film of any one of the clauses herein, wherein the seaweed-based thin film has a thickness of no more than 8 mils.

28. The seaweed-based thin film of any one of the clauses herein, wherein the seaweed-based thin film comprises a product window, shopping bag, poly bag, bubble wrap, polymailer, pouch, sachet, shrink film, cling wrap or wrapper.

29. A method for producing a flexible thin film derived in part from seaweed, the method comprising:
mixing a formulation to form an aqueous mixed solution, wherein the formulation comprises (i) a seaweed-based compound comprising agar, alginate, carrageenan, semi-refined seaweed, and/or unprocessed seaweed; (ii) an agent comprising glycerin, sorbitol, sodium lignosulphonate, potassium lignosulphonate, lignosulphonate, ethylene glycol, polyethylene glycol, polyglyceride fatty acid esters, guar gum, tributyl citrate, ethylene glycol, and/or propylene glycol; and (iii) water;
casting the mixed solution to form a film having a first thickness; and drying the film to form a dried film having a solids content and second thickness less than the first thickness, wherein the dried film comprises—
50-90 wt % of the phycocolloid,
no more than 40 wt % of the agent, and
0.1-50 wt % of the water.

30. The method of any one of the clauses herein, wherein the formulation comprises a solids content of at least 7 wt %, 10 wt %, 15 wt %, 20 wt %, 25 wt %, 30 wt %, 35 wt %, or 7-35 wt %.

31. The method of any one of the clauses herein, wherein the seaweed-based compound comprises unprocessed seaweed.

32. The method of any one of the clauses herein, wherein the first thickness is no more than 50 mils or 20-50 mils.

33. The method of any one of the clauses herein, wherein the second thickness is no more than 5 mils or 0.1-5 mils.

34. The method of any one of the clauses herein, wherein mixing the formulation comprises mixing the formulation at a temperature of at least 160° F., 170° F., or 180° F.

35. A system for producing a flexible thin-film derived in part from seaweed, the system comprising:
a mixer configured to mix a formation to form an aqueous mixed solution, wherein the formulation comprises (i) a seaweed-based compound comprising agar, alginate, carrageenan, and/or unprocessed seaweed; (ii) an agent comprising glycerin, sorbitol, sodium lignosulphonate, potassium lignosulphonate, lignosulphonate, ethylene glycol, polyethylene glycol, polyglyceride fatty acid esters, guar gum, tributyl citrate, ethylene glycol, and/or propylene glycol; and (iii) water;
a casting unit downstream of the mixer, wherein the casting unit is configured to receive the mixed solution and form a film; and
a dryer downstream of the casting unit and configured to dry the film to produce the seaweed-based thin film of any one of the clauses herein.

36. A coated substrate, comprising:
a substrate comprising paper, polyvinyl alcohol, polyester, and/or polyolefin; and
a coating applied to the substrate, the coating comprising:
a seaweed-based composition comprising agar, alginate, carrageenan, and/or unprocessed seaweed;
an agent comprising glycerin, sorbitol, sodium lignosulphonate, potassium lignosulphonate, calcium lignosulphonate, ammonium lignosulphonate, lignosulphonate, ascorbic acid, citric acid, ethylene glycol, polyvinyl alcohol, polyethylene glycol, polyglyceride fatty acid esters, guar gum, tributyl citrate, erucamide, calcium carbonate, propylene glycol, natural colorants, and/or odor absorbers; and
water,
wherein the coating comprises 5-99 wt % of the coated substrate.

37. The coated substrate of any one of the clauses herein, wherein the substrate consists essentially of polyvinyl alcohol, and wherein:
the polyvinyl comprises 1-5 wt % of the coated substrate, and
the coating comprises 95-99 wt % of the coated substrate.

38. The coated substrate of any one of the clauses herein, wherein the substrate consists essentially of paper, and wherein:
the paper comprises 90-99 wt % of the coated substrate, and
the coating comprises 1-10 wt % of the coated substrate.

39. The coated substrate of any one of the clauses herein, wherein the substrate comprises a heat-sealable layer.

40. The coated substrate of any one of the clauses herein, wherein the coating comprises an oxygen barrier coating.

We claim:

1. A seaweed-based thin film, comprising:
a seaweed-based composition comprising agar, alginate, carrageenan, semi-refined seaweed, and/or unprocessed seaweed;
an agent comprising glycerin, sorbitol, sodium lignosulphonate, potassium lignosulphonate, calcium lignosulphonate, ammonium lignosulphonate, lignosulphonate, ascorbic acid, polyglyceride fatty acid esters, guar gum, tributyl citrate, erucamide, calcium carbonate, natural colorants, and/or odor absorbers; and
water,
wherein:
the seaweed-based composition comprises 50-90 wt % of the seaweed-based thin film,
the agent comprises no more than 40 wt % of the seaweed-based thin film,
when in a salt concentration of more than 900 microSiemens, the thin film composition exhibits a degree of swelling of no more than 200%, and
the water comprises 0.1-50 wt % of the seaweed-based thin film.

2. The seaweed-based thin film of claim 1, wherein the seaweed-based composition consists essentially of agar and the agent consists essentially of glycerin and natural colorants, and wherein:
the agar comprises 70-75 wt % of the seaweed-based thin film,
the glycerin comprises 25-30 wt % of the seaweed-based thin film, and
the natural colorants comprise 0.1-5 wt % of the seaweed-based thin film.

3. The seaweed-based thin film of claim 1, wherein the seaweed-based composition consists essentially of agar, and wherein:
the agar comprises 50-80 wt % of the seaweed-based thin film, and
the agent comprises 20-40 wt % of the seaweed-based thin film.

4. The seaweed-based thin film of claim 1, wherein the seaweed-based composition comprises agar and unprocessed seaweed and the agent comprises glycerin and/or sorbitol, and wherein:
the agar comprises 50-80 wt % of the seaweed-based thin film,
the unprocessed seaweed comprises 0.5-20 wt % of the seaweed-based thin film, and
the agent comprises 20-40 wt % of the seaweed-based thin film.

5. The seaweed-based thin film of claim 1, wherein the seaweed-based composition consists essentially of agar and unprocessed seaweed and the agent comprises glycerin and/or sorbitol, and wherein:
the agar comprises 50-80 wt % of the seaweed-based thin film,
the unprocessed seaweed comprises 1-20 wt % of the seaweed-based thin film, and
the agent comprises 20-40 wt % of the seaweed-based thin film.

6. The seaweed-based thin film of claim 1, wherein the seaweed-based composition comprises agar and unprocessed seaweed and the agent comprises glycerin and sorbitol, and wherein:

the agar comprises 50-80 wt % of the seaweed-based thin film, the unprocessed seaweed comprises 1-20 wt % of the seaweed-based thin film, the glycerin comprises 20-30 wt % of the seaweed-based thin film, and the sorbitol comprises no more than 10 wt % of the seaweed-based thin film.

7. The seaweed-based thin film of claim 1, wherein the seaweed-based composition consists essentially of agar and unprocessed seaweed and the agent consists essentially of glycerin and sorbitol, and wherein:

the agar comprises 50-80 wt % of the seaweed-based thin film, the unprocessed seaweed comprises 1-20 wt % of the seaweed-based thin film, the glycerin comprises 20-30 wt % of the seaweed-based thin film, and the sorbitol comprises no more than 10 wt % of the seaweed-based thin film.

8. The seaweed-based thin film of claim 1, wherein the seaweed-based composition comprises agar and the agar is 50-80 wt % of the seaweed-based thin film.

9. The seaweed-based thin film of claim 1, wherein the seaweed-based composition includes unprocessed seaweed and the unprocessed seaweed is 0.5-20 wt % of the seaweed-based thin film.

10. The seaweed-based thin film of claim 1, wherein the agent includes glycerin and the glycerin is 20-40 wt % of the seaweed-based thin film.

11. The seaweed-based thin film of claim 1, wherein the agent includes sorbitol and the sorbitol is no more than 10 wt % of the seaweed-based thin film.

12. The seaweed-based thin film of claim 1, wherein the seaweed-based composition includes agar and unprocessed seaweed.

13. The seaweed-based thin film of claim 1, wherein the agent comprises glycerin and at least one of lignosulphonate, citric acid, calcium carbonate, erucamide, lecithin, and wherein the seaweed-based composition comprises agar.

14. The seaweed-based thin film of claim 1, wherein the agent comprises 15-30% glycerin and at least one of lignosulphonate, citric acid, calcium carbonate, erucamide, or lecithin.

15. A seaweed-based thin film, comprising:

a seaweed-based composition comprising agar, alginate, carrageenan, semi-refined seaweed, and/or unprocessed seaweed;

an agent comprising glycerin, sorbitol, sodium lignosulphonate, potassium lignosulphonate, calcium lignosulphonate, ammonium lignosulphonate, lignosulphonate, ascorbic acid, citric acid, ethylene glycol, polyethylene glycol, polyglyceride fatty acid esters, guar gum, tributyl citrate, erucamide, calcium carbonate, propylene glycol, natural colorants, and/or odor absorbers; and water, wherein:

the seaweed-based composition comprises 50-90 wt % of the seaweed-based thin film, the agent comprises no more than 40 wt % of the seaweed-based thin film, the water comprises 0.1-50 wt % of the seaweed-based thin film, and when in a salt concentration of less than 900 microSiemens, the thin film composition exhibits a degree of swelling of no more than 300%.

16. The seaweed-based thin film of claim 1, wherein:

when in a salt concentration of less than 900 microSiemens, the thin film composition exhibits a degree of swelling of no more than 300%.

17. The seaweed-based thin film of claim 1, wherein the seaweed-based thin film is compostable as to guidelines set by ASTM D6400 or TUV Austria certification.

18. The seaweed-based thin film of claim 1, wherein the seaweed-based thin film is heat sealable at 100-160° C.

19. The seaweed-based thin film of claim 1, wherein the seaweed-based thin film has a heat seal strength according to ASTM F88 of no more than 10 N/mm.

20. The seaweed-based thin film of claim 1, wherein the seaweed-based thin film has a strain-at-break of at least 20% in tensile testing according to ASTM D882 at a 20 millimeter/minute rate.

21. The seaweed-based thin film of claim 1, wherein the seaweed-based thin film has a strength of at least 25 Megapascals in tensile testing according to ASTM D882 at a 20 millimeter/minute rate.

22. The seaweed-based thin film of claim 1, wherein the seaweed-based thin film has a stiffness or elastic modulus of at least 150 MPa in tensile testing according to ASTM D882 at a 20 millimeter/minute rate.

23. The seaweed-based thin film of claim 1, wherein the seaweed-based thin film has a thickness of no more than 8 mils.

24. The seaweed-based thin film of claim 1, wherein the seaweed-based thin film comprises a product window, shopping bag, poly bag, bubble wrap, polymailer, pouch, sachet, shrink film, cling wrap, or wrapper.

25. A coated substrate, comprising:

a substrate comprising paper, polyvinyl alcohol, polyester, and/or polyolefin; and a coating applied to the substrate, the coating comprising:

a seaweed-based composition comprising agar, alginate, carrageenan, semi-refined seaweed, and/or unprocessed seaweed;

an agent comprising glycerin, sorbitol, sodium lignosulphonate, potassium lignosulphonate, calcium lignosulphonate, ammonium lignosulphonate, lignosulphonate, ascorbic acid, polyglyceride fatty acid esters, guar gum, tributyl citrate, erucamide, calcium carbonate, natural colorants, and/or odor absorbers; and water, wherein the coating comprises 5-99 wt % of the coated substrate, and wherein, when in a salt concentration of more than 900 microSiemens, the thin film composition exhibits a degree of swelling of no more than 200%.

26. The coated substrate of claim 25, wherein the substrate consists essentially of polyvinyl alcohol, and wherein:

the polyvinyl alcohol comprises 1-5 wt % of the coated substrate, and the coating comprises 95-99 wt % of the coated substrate.

27. The coated substrate of claim 25, wherein the substrate consists essentially of paper, and wherein:

the paper comprises 90-99 wt % of the coated substrate, and the coating comprises 1-10 wt % of the coated substrate.

28. A coated substrate, comprising:

a substrate comprising paper, polyvinyl alcohol, polyester, and/or polyolefin; and a coating applied to the substrate, the coating comprising:

a seaweed-based composition comprising agar, alginate, carrageenan, semi-refined seaweed, and/or unprocessed seaweed;

an agent comprising glycerin, sorbitol, sodium lignosulphonate, potassium lignosulphonate, calcium lignosulphonate, ammonium lignosulphonate, lignosulphonate, ascorbic acid, citric acid, ethylene glycol, polyvinyl alcohol, polyethylene glycol, polyglyceride fatty acid esters, guar gum, tributyl citrate, erucamide, calcium carbonate, propylene glycol, natural colorants, and/or odor absorbers; and water, wherein the coating comprises 5-99 wt % of the coated substrate, and wherein the substrate comprises a heat-sealable layer.

29. The coated substrate of claim 25, wherein the coating comprises an oxygen barrier coating.

* * * * *